Patented May 24, 1932

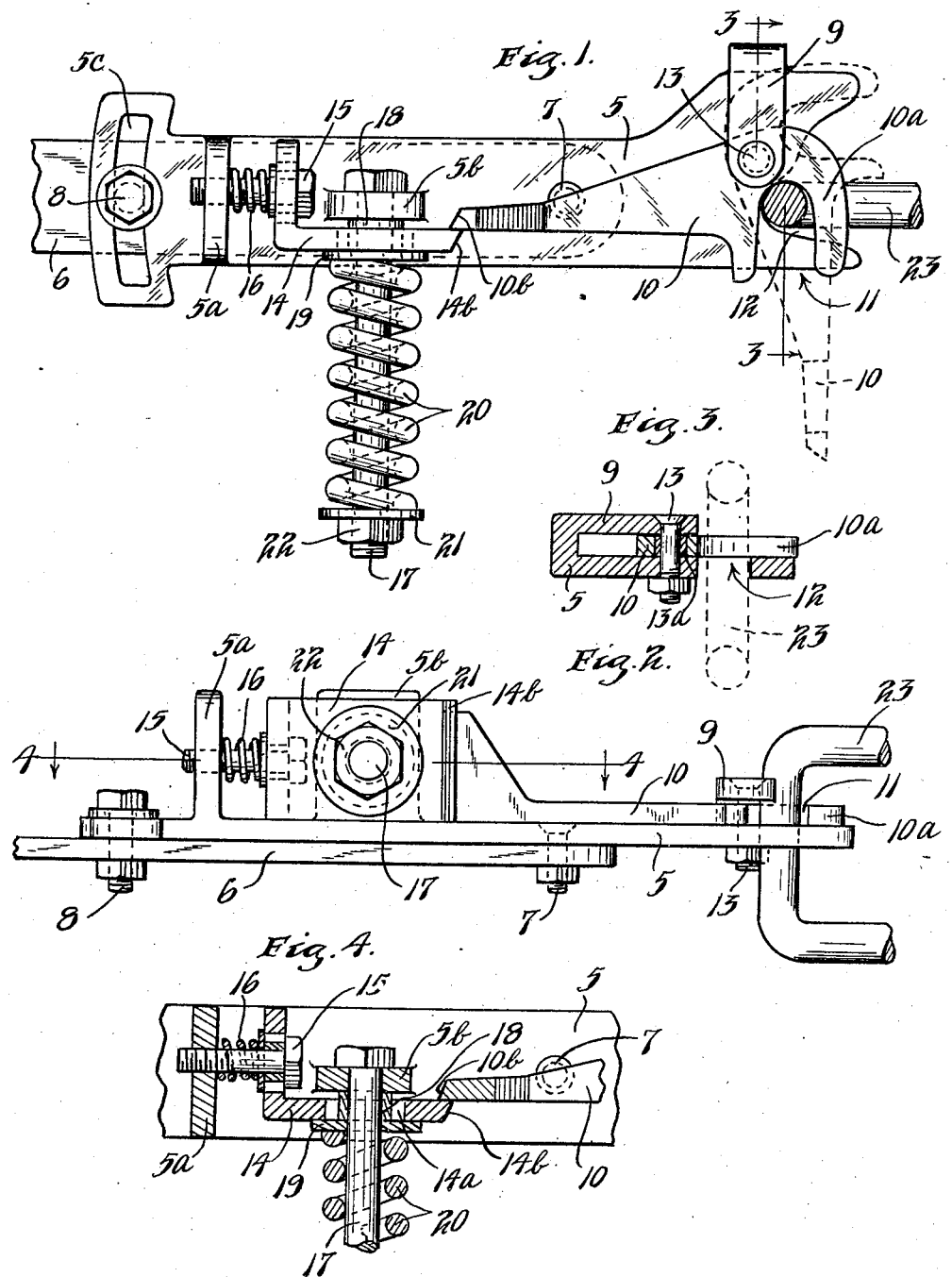

1,859,488

UNITED STATES PATENT OFFICE

ALVIN J. APMAN, OF NEAR STILLWATER, MINNESOTA, ASSIGNOR OF ONE-HALF TO MABLE V. APMAN, OF STILLWATER, MINNESOTA

HITCH

Application filed April 2, 1931. Serial No. 527,109.

This invention relates to a hitch or draft device for connecting an implement such as a plow with a draft machine, tractor or team. Devices of this general class are widely used and in most instances are so constructed that when a predetermined strain greater than the normal pulling strain between the draft device and the implement is encountered, an automatic disconnection will occur insuring the implement and hitch lugs or brackets against breakage.

It is an object of my invention to provide a simple and improved hitch of the class described which can be adjusted to release at a desired predetermined strain and wherein the releasing element or coupling when in open position will permit automatic coupling of the device.

It is a further object to provide a strong hitch of simple construction which may be manually released with safety when so desired.

Another object is to provide a hitch of the class described wherein a limited freedom or pivotal motion either on a vertical or horizontal axis, as desired, is provided in the coupling or hitch itself.

These and other objects and advantages of the invention will be more fully set forth in the following description made in connection with the accompanying drawings, in which like reference characters refer to similar parts throughout the several views, and in which:—

Fig. 1 is a top plan view of an embodiment of my invention coupled to a hitch lug of a tractor and a hitch link of a plow or other implement;

Fig. 2 is a side elevation of the same;

Fig. 3 is a detailed cross section taken on the line 3—3 of Fig. 1, and

Fig. 4 is a cross section taken on the line 4—4 of Fig. 2.

In the embodiment of the invention illustrated a draft bar 5 is provided and may be constructed in the form of a relatively heavy casting having adjacent one end thereof an upstanding supporting lug 5a and having at an intermediate portion thereof and disposed in a plane at right angles to said first mentioned lug a second supporting lug 6a. A clevis bar 6 is pivoted by a heavy bolt 7 beneath the intermediate portion of draft bar 5 and said clevis bar is guided in an arcuate slot 5c, provided at one end of the draft bar by means of a pin or bolt 8, to limit the relative swinging of the two bars.

At the opposite end of the draft bar 5 and pivoted to a widened portion thereof I provide a yoke 9 which may be integrally formed with the draft bar if desired and to which is pivotally secured a swingable coupling arm 10. Coupling arm 10 carries at its outer end a hook element 10a which has a lateral slot or recess 11 formed therein adapted to cooperate with a recess 12 formed in the adjacent end of draft bar 5. A heavy bolt or pin 13 extends through yoke 9, coupling arm 10 and draft bar 5 to pivot the parts for swingable movement. Bolt 13 preferably carries a spacing sleeve or bushing 13a disposed between the ends of the yoke 9 to permit free pivotal action on the part of the coupling arm 10. The inner end of coupling arm 10 is provided with a beveled retaining lug 10b which is adapted to be engaged and held in operative locked position by means of an angle-shaped latch 14. Latch 14 has an arm which extends transversely of the draft bar and is yieldingly connected with supporting lug 5a. Connections may be conveniently made by means of a bolt 15 tapped into said lug and on which said arm of the latch is slidably mounted and a coil spring 16 is interposed between the adjacent face of lug 5a and said latch arm to normally hold said latch inwardly.

The operating arm of latch 14 extends longitudinally of the draft bar and is provided with a slot 14a through which a tension bolt 17 extends, said bolt being connected at its inner end to the supporting lug 5b. A spacing collar 18 surrounds tension bolt 17 and is disposed within the slot 14a of the latch and a washer or collar 19 is interposed on the outward side of the operating arm of the latch and a heavy tensile coil spring 20 abuts said washer and surrounds bolt 17 being interposed between said washer and a second washer 21 abutted against an adjusting nut 22 threaded to the outer end of bolt 17.

The operating arm with latch 14 has a beveled extremity 14b which is normally positioned by spring 16 to engage the retaining lug 10b of the coupling arm when said arm is disposed in closed or operative position as shown in Fig. 1.

The clevis bar 6 may be connected at its outer end (not shown) with an impdement, such as a plow or the like in which case the hook 10a of the coupling arm will engage and interlock with a clevis or hitch lug 23 of a tractor or other draft device.

It will, of course, be apparent that my hitch may be reversed if desired. That is, the clevis bar 6 may be connected with the implement to be drawn, while the coupling bar may connect with a clevis on the implement.

It will be noted by referring to Fig. 1 that in the open position of the coupling arm as indicated by the dotted lines, the recess 11 of the arm will be positioned to be engaged by the clevis or hitch lug 23 and will enable the device to be readily coupled if desired by swinging the coupling arm from the dotted line position into the full line position shown in the drawing, whereupon the recess 12 at one end of the draft bar 5 nicely cooperates with the recess 11 of the coupling arm hook to provide a pivotal connection between the tractor lug or clevis and the hitch.

Operation

It will be noted that the latch member 14 is mounted on its supporting bolt 15 for a limited lateral movement relative to said bolt as well as for movement longitudinally of said bolt. The tension of spring 16 is sufficient to normally maintain the latch in inwardly projected position with its extremity 14b abutting the retaining lug 10b of the coupling arm. The tension placed upon the heavy spring 20 determines of course the amount of strain which is required to release the coupling arm automatically.

In the operation of the device strain is placed upon the hook portion 10a of the coupling arm at a point eccentrically of the pivot 13 for said arm. When this strain exceeds a predetermined amount the lug 10b of the coupling arm will force latch 14 laterally and outwardly and will slip past the retaining extremity 14b immediately effecting the disconnecting of the coupling with the tractor or draft device.

My hitch may be adjusted for releasing at various predetermined strains within wide limits by varying the tension of the heavy spring 20 through the manipulation of the adjustment nut 22. Further adjustment may be effected by regulating the supporting bolt 15 which carries the latch in that way varying slightly the position of the retaining extremity 14b.

To manually uncouple the device it is only necessary to press the short or transverse arm of latch 14 in the direction of the supporting lug 5a and against the relatively small tension of spring 16 thereby moving the latch member 14 longitudinally of the draft bar and permitting lug 10b of the coupling arm to slip past the latch.

The pivoted connection between the intermediate portion of draft arm 5 and the clevis arm 6 in cooperation with the guiding means 5c for engaging the guide bolt 8 provides freedom for a limited swinging movement between the draft device and the implement to permit proper draft alignment between the two.

From the foregoing description it will be seen that I have provided a simple, inexpensive and highly efficient hitch adapted to be quickly coupled or uncoupled and adjustable to permit automatic release when the desired predetermined strain is produced upon a coupling bar. Automatic coupling may be effected by backing the tractor into the open coupling bar.

It will, of course, be understood that various changes may be made in the form, details, arrangement and proportions of the parts without departing from the scope of my invention, which, generally stated, consists in a device capable of carrying out the objects above set forth, and in the novel parts and combinations of parts disclosed and defined in the appended claims.

What is claimed is:—

1. In an automatic hitch, a body having a recessed end, a coupling arm pivoted to said body at a point disposed at one side of said recess, said coupling arm having a hook at the outer end thereof cooperating with the recessed portion of said body, the opposite end of said coupling arm being provided with a retaining element, a latch mounted on said body and adapted to be moved longitudinally of said body and also transversely of said body, means for yieldingly holding said latch in extreme inward longitudinal movement and yieldable means directed transversely of said body for resisting the transverse movement of said latch, said latch having an element disposed longitudinally of said body for lapping and engaging with the retaining element of said arm.

2. In an automatic hitch, an elongated body constituting a draft bar and having a yoke adjacent one end thereof, a coupling arm pivoted in said yoke and having a lateral recess extending into one of the longitudinal sides thereof adjacent one end, said recess terminating at a point disposed eccentrically of the pivot for said arm, said body having a recessed end cooperating with the recessed portion of said arm to form a coupling, said arm when in operative position extending longitudinally of said body and terminating in an inner retaining end, a latch in the form of an angle member connected with said body for limited longitudinal movement relative to said body and for limited transverse movement relative to said body, means for yieldingly holding said latch to its extreme inward longitudinal movement, a supporting lug fixed to the medial portion of said body, a tension bolt connected with said supporting lug and extending transverse of said body and projecting outwardly from one of the longitudinal edges thereof, a coil spring mounted on the outer portion of said bolt and interposed between said latch and an abutment element secured to said bolt, said latch having a retaining element disposed longitudinally of said body and adapted to lap and engage with the retaining end of said coupling arm.

3. In an automatic hitch, an elongated body, a clevis arm pivoted to the medial portion of said body and under-lying the same, means for limiting the relative swinging between said clevis arm and said body, said body having an integrally formed element extending inwardly from one of the longitudinal edges thereof and adjacent one of the ends thereof to form with said body a yoke, a coupling arm pivoted to said element at a point adjacent one end thereof, said arm having a laterally extending recess adjacent said end, said recess terminating at a point eccentric of said pivot, a recess in the adjacent end of said body adapted to cooperate with the recessed portion of said arm to form a coupling, said arm extending longitudinally of said body when in operative position, said body having an upstanding supporting lug and a bolt secured to said supporting lug and extending longitudinally of said body, a latch slidably mounted on said bolt and having a retaining arm extending longitudinally of said body and adapted to lap and engage a retaining element of said coupling arm, a spring surrounding said bolt and interposed between said supporting lug and said latch for yieldingly holding said latch in operative position and for permitting said latch to be manually disengaged from said coupling arm and resilient means extending transversely of said body and connected therewith for resisting the transverse movement of said latch.

4. In an automatic hitch, an elongated body, a coupling arm pivoted to said body and having a hook at its outer end cooperating with one end of said body for attachment to a draft element, the opposite end of said coupling arm being provided with a retaining element, an angular shaped latch having an attachment arm extending transversely of said body and having a retaining arm extending longitudinally of said body, adjustable means for connecting said attachment arm with said body with freedom for movement of said latch longitudinally of said body and also with freedom for limited movement of said latch transversely of said body, adjustable means for yieldingly holding said latch in extreme inward longitudinal movement and yieldable means for holding the retaining arm of said latch in lapped relation with the retaining element of said coupling arm.

In testimony whereof I affix my signature.
ALVIN J. APMAN.